United States Patent
Hayashima et al.

(10) Patent No.: US 12,187,264 B2
(45) Date of Patent: Jan. 7, 2025

(54) CONTROL APPARATUS FOR VEHICLE

(71) Applicant: TOYOTA JIDOSHA KABUSHIKI KAISHA, Toyota (JP)

(72) Inventors: Naoki Hayashima, Toyota (JP); Nobufusa Kobayashi, Okazaki (JP); Yoshiaki Tsuruta, Nagakute (JP); Koki Minamikawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 199 days.

(21) Appl. No.: 17/986,267

(22) Filed: Nov. 14, 2022

(65) Prior Publication Data

US 2023/0192065 A1 Jun. 22, 2023

(30) Foreign Application Priority Data

Dec. 22, 2021 (JP) .................................. 2021-208696

(51) Int. Cl.
| | |
|---|---|
| *B60W 20/13* | (2016.01) |
| *B60K 6/48* | (2007.10) |
| *B60W 10/06* | (2006.01) |
| *B60W 10/08* | (2006.01) |
| *B60W 10/26* | (2006.01) |

(52) U.S. Cl.
CPC ............ *B60W 20/13* (2016.01); *B60K 6/48* (2013.01); *B60W 10/06* (2013.01); *B60W 10/08* (2013.01); *B60W 10/26* (2013.01); *B60W 2510/244* (2013.01); *B60W 2710/0666* (2013.01); *B60W 2710/086* (2013.01)

(58) Field of Classification Search
None
See application file for complete search history.

(56) References Cited

U.S. PATENT DOCUMENTS

| | | | |
|---|---|---|---|
| 10,358,129 B2 * | 7/2019 | Payne | ................ B60W 30/143 |
| 11,065,974 B2 * | 7/2021 | Kodera | .................... B60L 53/68 |
| 11,198,424 B2 * | 12/2021 | Vogt | ................ B60W 30/1882 |
| 2008/0125265 A1 * | 5/2008 | Conlon | .................... B60K 6/40 475/5 |

(Continued)

FOREIGN PATENT DOCUMENTS

| | | |
|---|---|---|
| JP | 2012-086772 A | 5/2012 |
| JP | 2020-104761 A | 7/2020 |

*Primary Examiner* — Jonathan M Dager
(74) *Attorney, Agent, or Firm* — Oliff PLC (57) ABSTRACT

A control apparatus for a vehicle that includes an engine as a drive power source, a rotating machine as an electric power generator, and an electric storage device. The control apparatus executes an automatic drive control for automatically controlling a torque of the drive power source in accordance with a requested drive torque without requiring an acceleration/deceleration operation by a driver of the vehicle. During an engine running of the vehicle, the rotating machine is rotated by the engine to generate an electric power, and a charging amount, by which the electric storage device is to be charged, is controlled by controlling the electric power generated by the rotating machine. The control apparatus is configured, during an automatic driving of the vehicle, to set the charging amount such that the charging amount is smaller when the requested drive torque is small than when the requested drive torque is large.

4 Claims, 3 Drawing Sheets

(56) References Cited

U.S. PATENT DOCUMENTS

| | | | |
|---|---|---|---|
| 2008/0157539 A1* | 7/2008 | Tani | H02J 1/14 |
| | | | 290/40 C |
| 2010/0030416 A1* | 2/2010 | Jinno | B60L 15/2045 |
| | | | 903/945 |
| 2012/0022731 A1* | 1/2012 | Kuang | B60K 6/52 |
| | | | 180/65.21 |
| 2014/0074331 A1* | 3/2014 | Shin | B60W 10/02 |
| | | | 180/65.265 |
| 2014/0148985 A1* | 5/2014 | Sato | B60W 10/26 |
| | | | 903/903 |
| 2014/0222270 A1* | 8/2014 | Tsutsumi | B60W 10/08 |
| | | | 180/65.265 |
| 2016/0036308 A1* | 2/2016 | Bailey | B63H 21/20 |
| | | | 310/91 |
| 2016/0144849 A1* | 5/2016 | Minamikawa | B60W 10/06 |
| | | | 180/65.265 |
| 2016/0153417 A1* | 6/2016 | Tochigi | F02N 11/0825 |
| | | | 123/339.24 |
| 2016/0214490 A1* | 7/2016 | Soo | B60L 58/12 |
| 2016/0257299 A1* | 9/2016 | Ikedaya | B60K 6/387 |
| 2017/0028978 A1* | 2/2017 | Dunlap | B60W 10/26 |
| 2017/0320482 A1* | 11/2017 | Leone | F02M 26/36 |
| 2018/0065622 A1* | 3/2018 | Nishimine | B60W 10/115 |
| 2018/0203456 A1* | 7/2018 | Nagasaka | B60W 10/20 |
| 2018/0244169 A1* | 8/2018 | Meyer | B60L 15/2054 |
| 2018/0257634 A1* | 9/2018 | Zhao | B60W 10/06 |
| 2018/0290645 A1* | 10/2018 | Zhao | B60W 50/0097 |
| 2018/0354368 A1* | 12/2018 | Gotoh | B60L 58/12 |
| 2018/0354492 A1* | 12/2018 | Meyer | B60W 10/26 |
| 2019/0023257 A1* | 1/2019 | Doering | F16H 61/688 |
| 2019/0217844 A1* | 7/2019 | Pursifull | B60W 10/06 |
| 2021/0300421 A1* | 9/2021 | Miyaoka | B60W 20/19 |
| 2021/0370908 A1* | 12/2021 | Hawley | B60L 58/15 |
| 2022/0009474 A1* | 1/2022 | Zhao | B60W 30/18072 |
| 2024/0149924 A1* | 5/2024 | Igarashi | B60W 20/10 |

* cited by examiner

CONTROL APPARATUS FOR VEHICLE

This application claims priority from Japanese Patent Application No. 2021-208696 filed on Dec. 22, 2021, the disclosure of which is herein incorporated by reference in its entirety.

FIELD OF THE INVENTION

The present invention relates to a control apparatus for a vehicle, and more particularly, to a control apparatus for a vehicle wherein the control apparatus includes a charging control portion configured to charge an electric storage device by causing a rotating machine to generate an electric power by driving and rotating the rotating machine by an engine.

BACKGROUND OF THE INVENTION

There is known a control apparatus for a vehicle that includes an engine used as a drive power source, a rotating machine serving as at least an electric power generator, and an electric storage device, wherein the control apparatus includes: (a) an automatic-drive control portion configured to execute an automatic drive control for automatically controlling a torque of the drive power source in accordance with a requested drive torque that is obtained for causing the vehicle to run with a predetermined target running state without requiring an acceleration/deceleration operation by a driver of the vehicle; and (b) a charging control portion configured, during an engine running of the vehicle using the engine as the drive power source, to cause the rotating machine to generate an electric power by driving and rotating the rotating machine by the engine, and to control a charging amount by which the electric storage device is to be charged, by controlling the electric power generated by the rotating machine, while increasing the torque of the engine, depending on the controlled charging amount. JP-2012-86772A discloses a hybrid electric vehicle including a control apparatus as an example of such a control apparatus. In the disclosed hybrid electric vehicle in which the rotating machine is constituted by a motor generator serving as an electric motor and an electric power generator, a rate of change of the charging amount, i.e., a rate of change of a torque of the engine, upon start or termination of a charging control, is made lower when the automatic drive control is being executed than when the vehicle is being manually driven, so as to suppress change or fluctuation of a running speed of the vehicle due to abrupt change of the torque of the engine. That is, in the hybrid electric vehicle disclosed in the Japanese Patent Application Publication, the rate of change of the charging amount is reduced so as to alleviate a sense of discomfort due to fluctuation of a drive power, because it is difficult to completely compensate (offset) the fluctuation of the drive power caused by execution of the charging control, by simply controlling the torque of the engine.

SUMMARY OF THE INVENTION

However, even where the rate of change of the charging amount is made lower when the automatic drive control is being executed than when the vehicle is being manually driven, there is still a possibility that drivability (such as ride comfort) could be reduced due to fluctuation of the drive power caused upon increase of the engine torque, because the target charging amount is substantially the same when the automatic drive control is being executed as when the vehicle is being manually driven. That is, when the automatic drive control is being executed, since the acceleration/deceleration operation is not manually made by the vehicle driver, the vehicle driver is likely to feel the sense of discomfort even with a slight fluctuation of the drive power. Further, when the vehicle is running at a low speed with a small requested drive torque, the engine torque is increased by a relatively large amount due to execution of the charging control, thereby causing fluctuation of the drive power with a high possibility, and road noise is small during running of the vehicle at a low speed so that the fluctuation of the drive power is unlikely to be absorbed by the road noise and the drivability is problematically reduced due to the fluctuation of the drive power.

The present invention was made in view of the background art described above. It is therefore an object of the present invention to suppress reduction of drivability due to fluctuation of a drive power that could be caused in a charging control during execution of an automatic drive control.

The object indicated above is achieved according to the following aspects of the present invention.

According to a first aspect of the invention, there is provided a control apparatus for a vehicle that includes an engine used as a drive power source, a rotating machine serving as at least an electric power generator, and an electric storage device. The control apparatus includes: (a) an automatic-drive control portion configured to execute an automatic drive control for automatically controlling a torque of the drive power source in accordance with a requested drive torque that is obtained for causing the vehicle to run with a predetermined target running state without requiring an acceleration/deceleration operation by a driver of the vehicle; and (b) a charging control portion configured, during running of the vehicle using the engine as the drive power source, to cause the rotating machine to generate an electric power by driving and rotating the rotating machine by the engine, and to control a charging amount by which the electric storage device is to be charged, by controlling the electric power generated by the rotating machine, while increasing a torque of the engine, depending on the controlled charging amount. The charging control portion is configured, when the vehicle is being driven with execution of the automatic drive control, to set the charging amount, depending on the requested drive torque, such that the charging amount is smaller when the requested drive torque is small than when the requested drive torque is large. The above-described requested drive torque is a drive torque that is required to act on the dive wheels, and corresponds to a requested drive power or a requested drive force. Further, the requested drive torque, which is required to act on the drive wheels, can be replaced with a torque or a power that is required to be generated by the drive power source.

According to a second aspect of the invention, in the control apparatus according to the first aspect of the invention, when the vehicle is being manually driven with the torque of the drive power source being controlled in accordance with an acceleration/deceleration operation by the driver of the vehicle without the automatic drive control being executed by the automatic-drive control portion, the charging control portion is configured to set the charging amount to a basic charging amount so as to charge the electric storage device by the basic charging amount. When the vehicle is being driven with execution of the automatic drive control, the charging control portion is configured to set the charging amount to a variable amount which is variable depending on the requested drive torque and which is not larger than the basic charging amount.

According to a third aspect of the invention, in the control apparatus according to the second aspect of the invention, the charging control portion is configured to set the charging amount to the variable amount which is variable depending on the requested drive torque and which is not larger than the basic charging amount, on the condition that a running speed of the vehicle is not higher than a predetermined speed value, when the vehicle is being driven with execution of the automatic drive control. The charging control portion is configured to set the charging amount to the basic charging amount so as to charge the electric storage device by the basic charging amount, on the condition that the running speed of the vehicle is higher than the predetermined speed value, even when the vehicle is being driven with execution of the automatic drive control.

According to a fourth aspect of the invention, in the control apparatus according to the second or third aspect of the invention, the charging control portion is configured to set the charging amount to the variable amount which is variable depending on the requested drive torque and which is not larger than the basic charging amount, on the condition that a charged state value of the electric storage device is not lower than a predetermined state value, when the vehicle is being driven with execution of the automatic drive control. The charging control portion is configured to set the charging amount to the basic charging amount so as to charge the electric storage device by the basic charging amount, on the condition that the charged state value of the electric storage device is lower than the predetermined state value, even when the vehicle is being driven with execution of the automatic drive control.

According to a fifth aspect of the invention, in the control apparatus according to any one of the first through fourth aspects of the invention, the automatic-drive control portion is configured, during running of the vehicle at a low speed, to execute the automatic drive control, by causing a creep torque to be generated based on a rotational speed difference between input and output members of a torque converter that is provided in a power transmission path between the drive power source and the drive wheels.

In the control apparatus according to any one of the first through fifth aspects of the invention, in the charging control during the automatic driving of the vehicle, the charging amount is made smaller when the requested drive torque is small than when the requested drive torque is large. Therefore, when the requested drive torque is small, namely, when an influence of the drive power fluctuation caused by execution of the charging control is large, the increase of the engine toque due to the charging control is reduced whereby the drive power fluctuation is reduced, so that it is possible to suppress reduction of the drivability due to the drive power fluctuation, even when the road noise is small during running of the vehicle at a low speed. On the other hand, even during the automatic driving of the vehicle, when the requested drive torque is large, namely, when the influence of the drive power fluctuation caused by execution of the charging control is relatively small, the charging amount is increased whereby the electric storage device can be charged rapidly, so that it is possible to ensure a desired charging performance, while suppressing the reduction of the drivability when the requested drive torque is small.

In the control apparatus according to the second aspect of the invention, the vehicle can be manually driven with the torque of the drive power source being controlled in accordance with the acceleration/deceleration operation by the vehicle driver, such that the charging control is executed with the predetermined basic charging amount during the manual driving of the vehicle, and such that the charging control is executed with the variable amount as the charging amount which is variable depending on the requested drive torque and which is not larger than the basic charging amount during the automatic driving of the vehicle. Therefore, it is possible to appropriately maintain the charging performance during the manual driving of the vehicle in which the drive power fluctuation is unlikely to be problematic, and to appropriately suppress the reduction of the drivability due to the charging control during the automatic driving.

In the control apparatus according to the third aspect of the invention, during the automatic driving of the vehicle, the charging amount is set to the variable amount that is variable depending on the requested drive torque, on the condition that the running speed of the vehicle is not higher than the predetermined speed value, so that it is possible to appropriately suppress the reduction of the drivability due to the drive power fluctuation when the road noise is small during running of the vehicle at a low speed. On the other hand, even during the automatic driving of the vehicle, the charging amount is set to the basic charging amount as during the manual driving of the vehicle, when the running speed of the vehicle is relatively high, namely, when the road noise is so large that the drive power fluctuation is unlikely to be recognized, so that it is possible to suppress limitation of the charging amount to a minimally required degree.

In the control apparatus according to the fourth aspect of the invention, during automatic driving of the vehicle, the charging amount is set to the variable amount that is variable depending on the requested drive torque, on the condition that the charged state value of the electric storage device is not lower than the predetermined state value, so that it is possible to suppress the reduction of the drivability due to the drive power fluctuation caused with the requested drive torque being small, when the charging control is started with the charged state value being not lower than the predetermined state value. Even during the automatic driving of the vehicle, the charging amount is set to the basic charging amount as during the manual driving of the vehicle, when the charged state value of the electric storage device is lower than the predetermined state value. Therefore, it is possible to appropriately prevent an electric power amount stored in the electric storage device, from being insufficient, by quickly charging the electric storage device, so as to avoid insufficiency of the electric power amount stored in the electric storage device, while appropriately suppressing the reduction of the drivability due to the charging control executed with the requested drive torque being small in a case in which the charging control is started with the charged state value of the electric storage device being not lower than the predetermined state value.

In the control apparatus according to the fifth aspect of the invention, during running of the vehicle at a low speed, the automatic drive control is executed by causing the creep torque to be generated based on the rotational speed difference between the input and output members of the torque converter that is provided in the power transmission path between the drive power source and the drive wheels. When the charging control is started during the creep running of the vehicle at the low speed, the engine rotational speed could be increased with increase of the engine torque, regardless of generation of the electric power by the rotating machine. The increase of the engine rotational speed causes increase of the rotational speed difference between the input and output members of the torque converter and accordingly increase of the creep torque. Therefore, the drivability could be reduced by the drive power fluctuation caused due to the increase of the creep torque, and booming noise could be generated when the engine rotational speed passes through a resonance region in process of the increase of the engine rotational speed. Since the creep running is performed, in general, in a situation in which the requested drive torque is low, the increase of the engine torque caused by the charging control is reduced by reducing the charging amount by setting the charging amount to the variable amount that is variable depending on the requested drive torque, so that the increase of the engine rotational speed due to increase of the engine torque is reduced. Therefore, it is possible to reduce the increase of the creep torque caused by the increase of the rotational speed difference between the input and output members of the torque converter, due to the increase of the engine rotational speed, and accordingly to suppress the reduction of the drivability due to the drive power fluctuation caused by the increase of the creep torque and avoid or suppress generation of the booming noise in the process of the increase of the engine rotational speed.

DETAILED DESCRIPTION OF PREFERRED EMBODIMENT

The present invention is advantageously applied to a hybrid electric vehicle in which a motor generator capable of serving also as an electric motor is employed as a rotating machine that is to be used for a charging control, for example. In the hybrid electric vehicle to which the present invention is applied, it is also possible to provide, in addition to the rotating machine used for the charging control, another rotating machine that is to be used as a drive power source as well as an engine. The rotating machine used for the charging control may be constituted by a motor generator serving also as an electric power generator, although it does not have to necessarily serve as the electric power generator as long as serving at least as an electric motor. In the power transmission between the drive power source and the drive wheels, it is possible to provide an automatic transmission and/or a fluid transmission device (e.g., torque converter), as needed. The fluid transmission device may be replaced by an electric differential portion including a planetary gear device and a differential-control rotating machine or a starting clutch having a frictional engagement mechanism. The differential-control rotating machine may be used also as the rotating machine used for the charging control.

In the automatic drive control executed by the automatic-drive control portion, the target running state is defined by, for example, a target running speed and a target acceleration of the vehicle, a target brake force applied to the vehicle and/or a target inter-vehicle distance that is a distance from the vehicle to a preceding vehicle. The automatic-drive control portion executes a constant-speed running control for causing the vehicle to run at the target running speed that is substantially constant and/or a follow-up running control for causing the vehicle to run keeping the target inter-vehicle distance that is substantially constant. In the constant-speed running control, the automatic-drive control portion calculates the requested drive torque that is required to enable the vehicle to run at the target constant running speed set by the vehicle driver, for example, and controls the drive power source so as to obtain the calculated requested drive torque. In the follow-up running control, the automatic-drive control portion calculates the requested drive torque that is required to enable the vehicle to run keeping the inter-vehicle distance at the target constant inter-vehicle distance, and controls the drive power source so as to obtain the calculated requested drive torque. The requested drive torque can be calculated based on a difference between the target running speed and the actual running speed of the vehicle, for example, through a feedback control or a feedforward control. For obtaining the requested drive torque, the automatic-drive control portion controls the torque of the drive power source, and switches a currently established one of forward-drive gear positions in the automatic transmission to another one of the forward-drive gear positions, as needed. It is preferable that the torque of the drive power source is controlled not only to a positive value but also to a negative value by controlling an engine brake and/or a regeneration of the rotating machine. Although the automatic-drive control portion is configured to automatically control at least the torque of the drive power source such as the engine, the automatic-drive control portion may automatically control also a brake force of an automatic brake system and/or a steering angle of an automatic steering system.

For example, the charging control portion causes the electric storage device to be forcibly charged, upon satisfaction of a charging condition for charging the electric storage device such as when a charged state value (i.e., state of charge) of the electric storage device becomes smaller than an allowable lower limit SOCmin and when a temperature becomes so low that a discharging amount becomes large. To this end, the charging control portion causes the rotating machine to be driven and rotated by the engine during the engine running of the vehicle, so that the electric storage device is charged with an electric power generated by the rotating machine. Where the charging control portion sets the charging amount to a variable amount that is dependent on the requested drive torque when the vehicle is being driven with execution of the automatic drive control, it is preferable that the variable amount as the charging amount is continuously changed, namely, continuously reduced as the requested drive torque is reduced. However, the variable amount may be changed in multiple steps such as two or more steps. Further, apart from the charging control executed for forcibly charging the electric storage device, the electric storage device may be charged with the electric power generated by the rotating machine subjected to the regenerative control during deceleration or braking of the vehicle, such that the charged state value SOC is held within a range defined between the allowable lower limit SOCmin and an allowable upper limit SOCmax.

The charging control portion executes the charging control by charging the electric storage device by the predetermined basic charging amount, for example, during the manual driving of the vehicle. Although the basic charging amount may be a predetermined constant amount, the basic charging amount also may be a variable amount that is variable depending on, for example, a difference ΔSOC between a target charged state value SOCt and the current charged state value SOC of the electric storage device, or the requested drive torque. For example, even during the automatic driving of the vehicle, the charging control portion is configured to execute the charging control by charging the electric storage device by the basic charging amount, just as during the manual driving of the vehicle, if the running speed of the vehicle is higher than the predetermined speed value. However, the charging control portion may execute the charging control by charging the electric storage device by the variable amount dependent on the requested drive torque, during the automatic driving of the vehicle, regardless of whether the running speed is higher than the predetermined speed value or not. Further, for example, even during the automatic driving of the vehicle, the charging control portion is configured to execute the charging control by charging the electric storage device by the basic charging amount, just as during the manual driving of the vehicle, if the charged state value SOC of the electric storage device is lower than the predetermined state value. However, the charging control portion may execute the charging control by charging the electric storage device by the variable amount dependent on the requested drive torque, during the automatic driving of the vehicle, regardless of whether the charged state value SOC of the electric storage device is lower than the predetermined state value or not.

EMBODIMENT

There will be described an embodiment of the present invention in details with reference to drawings. It is noted that figures of the drawings are simplified or deformed as needed, and each portion is not necessarily precisely depicted in terms of dimension ratio, shape, etc.

Figure 1:
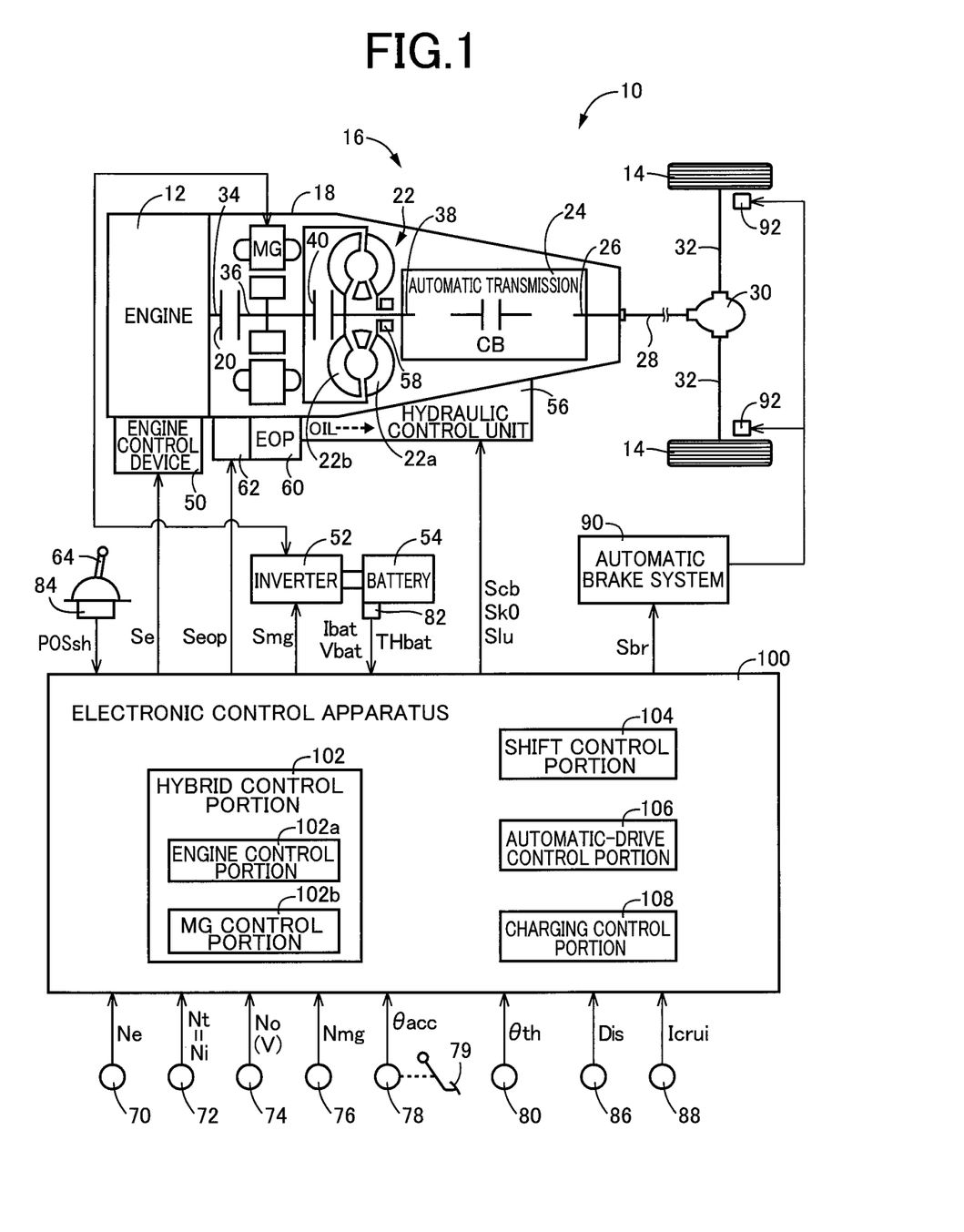
FIG. 1 is a view schematically showing a construction of a drive system of a hybrid electric vehicle including a control apparatus as an embodiment of the present invention, together with major portions of control functions and systems for executing various kinds of controls in the hybrid electric vehicle.

FIG. 1 is a view schematically showing a construction of a drive system of a hybrid electric vehicle 10 (hereinafter simply referred to as "vehicle 10") including an electronic control apparatus 100 as an embodiment of the present invention, together with major portions of control functions and systems for executing various kinds of controls in the electronic vehicle 10. As shown in FIG. 1, the vehicle 10 is a parallel-type hybrid electric vehicle including an engine 12 and a rotating machine MG as drive power sources for driving the vehicle 10. The vehicle 10 further includes a power transmission apparatus 16 that is provided in a power transmission path between the engine 12 and drive wheels 14. The drive wheels 14 are rear left and right wheels 14. The vehicle 10 is a front-engine rear-drive vehicle.

The engine 12 is an internal combustion engine such as gasoline engine and diesel engine. The vehicle 10 is provided with an engine control device 50 that includes a throttle actuator, a fuel injection device and an ignition device. With the engine control device 50 being controlled by the electronic control apparatus 100, an engine torque Te, which is an output torque of the engine 12, is controlled. The rotating machine MG is a motor generator having a function serving as an electric motor configured to generate a mechanical power from an electric power and a function serving as an electric power generator configured to generate an electric power from a mechanical power. The rotating machine MG is a three-phase AC synchronous motor, for example, and is connected to a battery 54 provided in the vehicle 10, through an inverter 52 provided in the vehicle 10. The inverter 52 is controlled by the electronic control apparatus 100 whereby an MG torque Tmg as a torque of the rotating machine MG and an MG speed Nmg as a rotational speed of the rotating machine MG are controlled. The rotating machine MG receives the electric power from the battery 54 through the inverter 52, and generates a drive power for driving the vehicle 10, in place of or in addition to the engine 12. Further, when being driven and rotated by the power of the engine 12 or by a driven power inputted from the drive wheels 14, the rotating machine MG is subjected to the regenerative control so as to serve as the electric power generator for generating the electric power, and so as to generate a regenerative brake if being connected to the drive wheels 14. The electric power generated by the rotating machine MG is stored in the battery 54 through the inverter 52. The battery 54 serves as an electric storage device configured to receive and supply the electric power from and to the rotating machine MG.

The power transmission apparatus 16 includes a casing 18, a K0 clutch 20, a torque converter 22 and an automatic transmission 24. In the casing 18 that is a non-rotary member attached to a body of the vehicle 10, the engine 12, the K0 clutch 20, the torque converter 22 and the automatic transmission 24 are arranged in a series in this order of description in a direction away from the engine 12. The rotating machine MG is disposed between the K0 clutch 20 and the torque converter 22 in a power transmission path between the engine 12 and the drive wheels 14. The K0 clutch 20 is an engine connecting/disconnecting device that is disposed between the engine 12 and the rotating machine MG in the power transmission path, so as to selectively connect and disconnect between the engine 12 and the rotating machine MG. The torque converter 22 is a fluid transmission device that is disposed between the rotating machine MG and the automatic transmission 24 in the in the power transmission path, so as to transmit the power through a working fluid OIL. The torque converter 22 is connected to the engine 12 through the K0 clutch 20. The automatic transmission 24 is connected to the torque converter 22, and is disposed between the torque converter 22 and the drive wheels 14 in the power transmission path. The power transmission apparatus 16 further includes a propeller shaft 28 connected to a transmission output shaft 26 as an output rotary member of the automatic transmission 24, a difference gear device 30 connected to the propeller shaft 28, and a pair of drive shafts 32 connected to the differential gear device 30. The power transmission apparatus 16 still further includes an engine connection shaft 34 connecting between the engine 12 and the K0 clutch 20 and an MG connection shaft 36 connecting between the K0 clutch 20 and the torque converter 22. The MG connection shaft 36 is connected to a rotor of the rotating machine MG.

The K0 clutch 20 is, for example, a wet-type or dry-type frictional engagement device (wet-type frictional engagement device in the present embodiment) constituted by a multiple-disc type or single-disc type clutch that is to be pressed by an actuator. A K0 torque Tk0 as a torque capacity of the K0 clutch 20 is changed by a regulated K0 hydraulic pressure PRO supplied to the K0 clutch 20 from a hydraulic control unit (hydraulic control circuit) 56, whereby a control or operation state of the K0 clutch 20 is switched between an engaged state and a released state, for example. The K0 clutch 20 includes input and output members, such that the input member of the K0 clutch 20 is connected to the engine connection shaft 34 so as to be rotatable integrally with the engine connection shaft 34, and such that the output member of the K0 clutch 20 is connected to the MG connection shaft 36 so as to be rotatable integrally with the MG connection shaft 36. When the K0 clutch 20 is in the engaged state, the rotor of the rotating machine MG and a pump impeller 22a of the torque converter 22 are rotatable integrally with the engine 12 through the engine connection shaft 34. When the K0 clutch 20 is in the released state, transmission of the power from the engine 12 to the rotor of the rotating machine MG and the pump impeller 22a of the torque converter 22 is interrupted.

Inside the casing 18, the rotating machine MG is connected to the MG connection shaft 36 in a power transmittable manner. The rotating machine MG is disposed between the engine 12 and the drive wheels 14, particularly, between the K0 clutch 20 and the torque converter 22 in the power transmission path, so as to be connected to the K0 clutch 20 and the torque converter 22 in a power transmittable manner. That is, the rotating machine MG is connected to the torque converter 22 and the automatic transmission 24 in a power transmittable manner without through the K0 clutch 20. The torque converter 22 and the automatic transmission 24 are configured to transmit the drive power from the engine 12 and the rotating machine MG toward the drive wheels 14.

The torque converter 22 includes the above-described pump impeller 22a connected to the MG connection shaft 36 and a turbine impeller 22b connected to a transmission input shaft 38 as an input rotary member of the automatic transmission 24. The pump impeller 22a is connected to the engine 12 though the K0 clutch 20, and is connected directly to the rotating machine MG. The pump impeller 22a is an input member of the torque converter 22 while the turbine impeller 22b is an output member of the torque converter 22. The MG connection shaft 36 serves also as an input rotary member of the torque converter 22. The transmission input shaft 38 is provided integrally with a turbine shaft that is to be driven and rotated by the turbine impeller 22b, and serves also an output rotary member of the torque converter 22. The torque converter 22 further includes an LU clutch 40 that is configured to selectively connect and disconnect between the pump impeller 22a and the turbine impeller 22b. The LU clutch 40 is a known lockup clutch, i.e., a direct clutch provided to connect between the input and output members of the torque converter 22.

An LU clutch torque Tlu as a torque capacity of the LU clutch 40 is changed by a regulated LU hydraulic pressure PRlu supplied to the LU clutch 40 from the hydraulic control unit 56, whereby a control or operation state of the LU clutch 40 is switched among a fully released state, a slipping state and a fully engaged state. In the fully released sate, the LU clutch 40 is fully released whereby the torque converter 22 is placed in a torque-converter state providing a torque boosting effect. In the slipping state, the LU clutch 40 is engaged while slipping. In the fully engaged state, the LU clutch 40 is fully engaged whereby the torque converter 22 is placed in a lock-up state in which the pump impeller 22a and the turbine impeller 22b are to be rotated integrally with each other.

The automatic transmission 24 is a known planetary-gear-type automatic transmission including at least one planetary gear device and a plurality of engagement devices CB. Each of the engagement devices CB is a hydraulically-operated frictional engagement device in the form of a multiple-disc type or a single-disc type clutch or brake that is to be pressed by a hydraulic actuator, or a band brake that is to be tightened by a hydraulic actuator, for example. Each of the engagement devices CB is configured to receive a CB hydraulic pressure PRcb that is a regulated hydraulic pressure supplied from the hydraulic control unit 56, whereby a CB torque Tcb, i.e., torque capacity of the engagement device CB is changed and its controlled or operation state is switched between an engaged state and a released state, for example.

The automatic transmission 24 is a step-variable automatic transmission configured to establish a selected one of a plurality of gear positions, with a corresponding one or ones of the engagement devices CB being engaged, wherein the gear positions are different from each other in gear ratio (speed ratios) $\gamma$ (=AT input rotational speed Ni/AT output rotational speed No), and wherein the plurality of gear positions include a plurality of forward-drive gear positions and a reverse-drive gear position. The automatic transmission 24 is configured to switch from one of the gear positions to another one of the gear positions, namely, to establish one of the gear positions which is selected, by the electronic control device 100, depending on, for example, an acceleration operation made by a vehicle driver (operator) and a running speed V of the vehicle 10. With all of the engagement devices CB being released, the automatic transmission 24 is placed in a neutral state in which transmission of the power is interrupted. The AT input rotational speed Ni is a rotational speed of the transmission input shaft 38, and is an input rotational speed of the automatic transmission 24. The AT input rotational speed Ni is also a rotational speed of the output member of the torque converter 22, and is equal to a turbine rotational speed Nt that is an output rotational speed of the torque converter 22. The AT output rotational speed No is a rotational speed of the transmission output shaft 26, and is an output rotational speed of the automatic transmission 24.

In the power transmission apparatus 16, the power outputted by the engine 12 is transmitted from the engine connection shaft 34 to the drive wheels 14, sequentially through the K0 clutch 20, MG connection shaft 36, torque converter 22, automatic transmission 24, propeller shaft 28, differential gear device 30 and drive shafts 32, when the K0 clutch 20 is engaged. Further, the power outputted by the rotating machine MG is transmitted from the MG connection shaft 36 to the drive wheels 14, sequentially through the torque converter 22, automatic transmission 24, propeller shaft 28, differential gear device 30 and drive shafts 32, irrespective of the operation state of the K0 clutch 20.

The vehicle 10 includes an MOP 58 that is a mechanical fluid pump (mechanical oil pump), an EOP 60 that is an electric fluid pump (electric oil pump) and a pump motor 62. The MOP 58 is connected to the pump impeller 22a, so as to be driven and rotated by the drive power sources (engine 12 and rotating machine MG) for outputting the working fluid OIL that is used in the power transmission apparatus 16. The pump motor 62 is an electric motor exclusively serving to drive and rotate the EOP 60. The EOP 60 is to be driven and rotated by the pump motor 62 so as to output the working fluid OIL at a desired timing, for example, during stop of the vehicle 10. The working fluid OIL outputted by the MOP 58 and/or EOP 60 is supplied to the hydraulic control unit 56. The hydraulic control unit 56 outputs the CB hydraulic pressure PRcb, K0 hydraulic pressure PR0 and LU hydraulic pressure PRlu that have been regulated based on the working fluid OIL outputted by the MOP 58 and/or EOP 60. The working fluid OIL is supplied to the torque converter 22 so as to be used for transmitting the power, and is used for lubricating and cooling various parts of the power transmission apparatus 16. The working fluid OIL is stored in a fluid storage portion such as an oil pan, which is provided below the casing 18, and the stored working fluid OIL is pumped by the MOP 58 and/or the EOP 60 so as to be supplied to the hydraulic control unit 56.

The vehicle 10 is provided with the electronic control apparatus 100 as a control apparatus that is configured to perform various control operations. The electronic control apparatus 100 includes a so-called microcomputer incorporating a CPU, a ROM, a RAM and an input-output interface. The CPU performs the various control operations of the vehicle 10, by processing various input signals, according to control programs stored in the ROM, while utilizing a temporary data storage function of the RAM. The electronic control apparatus 100 includes a plurality of computers such as an engine control computer, an MG control computer and a hydraulic control computer, as needed.

The electronic control apparatus 100 receives various input signals based on values detected by respective sensors provided in the vehicle 10. Specifically, the electronic control apparatus 100 receives: an output signal of an engine speed sensor 70 indicative of an engine rotational speed Ne that is a rotational speed of the engine 12; an output signal of a turbine speed sensor 72 indicative of a turbine rotational speed Nt that is equal to the AT input rotational speed Ni; an output signal of an output speed sensor 74 indicative of the AT output rotational speed No corresponding to the vehicle running speed V; an output signal of an MG speed sensor 76 indicative of the motor rotational speed Nm; an output signal of an accelerator-opening degree sensor 78 indicative of the accelerator opening degree (accelerator operation degree) θacc representing an amount of operation of an acceleration operating member 79 such as an accelerator pedal, which corresponds to a drive request amount requested by the vehicle driver; an output signal of a throttle-opening degree sensor 80 indicative of a throttle opening degree θth which is an opening degree of an electronic throttle valve; an output signal of a battery sensor 82 indicative of a battery temperature THbat, a battery charging/discharging electric current Ibat and a battery voltage Vbat; an output signal of a lever position sensor 84 indicative of one of operation positions POSsh in which a shift lever 64 is currently placed; an output signal of a vehicle distance sensor 86 such as millimeter wave radar indicative of an inter-vehicle distance Dis to a preceding vehicle; and an output signal of an auto-cruise setting switch 88 indicative of auto-cruise information Icrui.

The shift lever 64 is disposed in vicinity of a driver seat of the vehicle 10, and is a shift operating member that is to be operated by the vehicle driver so as to switch a shift range in which the power is transmittable in the automatic transmission 24. The shift lever 64 is to be placed by the vehicle driver into one of the operation positions POSsh that include a P position, an R position, a N position and a D position. When the shift lever 64 is placed in the P position, the automatic transmission 24 is placed in a neutral state in which the power transmission is interrupted and a P (parking) range is selected to mechanically inhibit rotation of the transmission output shaft 26, wherein the neutral state is a state in which all of the engagement devices CB are released, for example. When the shift lever 64 is placed in the R position, a R (reverse) range is selected to establish the reverse-drive gear position in the automatic transmission 24. When the shift lever 64 is placed in the N position, the automatic transmission 24 is placed in the neutral state (as when the shift lever 64 is placed in the P position) and a N (neutral) range is selected. When the shift lever 64 is placed in the D position, a D (drive) range is selected to establish one of the forward-drive gear positions that is to be automatically selected depending on an operation state such as the vehicle running speed V and the accelerator opening degree θacc, so as to drive the vehicle 10 with the selected one of the forward-drive gear positions. The shift lever 64 may be of a position-holding type so that the shift lever 64 is held in one of the operation positions POSsh into which the shift lever 64 has been placed. However, the shift lever 64 may be an automatic return type so that the shift lever 64 is automatically returned to a predetermined home position from one of the operation positions POSsh into which the shift lever 64 has been placed. Further, the shift operating member does not necessarily have to be constituted by the shift lever 64, but may be constituted by a push-button switch or the like for selecting one of shift ranges such as the above-described P range, R range, N range and D range.

The auto-cruise setting switch 88 is a switch that is to be operated to select an auto-cruise driving for causing the vehicle 10 to run at a constant running speed and to perform a follow-up running. The auto-cruise driving is a kind of automatic drive control for automatically controlling the engine 12 and the rotating machine MG as the drive power sources so as to cause the vehicle 10 to run in a predetermined target running state without requiring an acceleration/deceleration operation by the vehicle driver. That is, in the present embodiment, the vehicle 10 can be driven with execution of the auto-cruise driving in which the engine 12 and the rotating machine MG are automatically controlled depending on, for example, a target running speed Vt of the vehicle 10, in addition to being manually driven with the engine 12 and the rotating machine MG being controlled in accordance with the acceleration/deceleration operation of the acceleration operating member 79, for example, by the vehicle driver. The auto-cruise setting switch 88 is a device for not only selecting the auto-cruise driving but also setting or changing the target running speed Vt and a target inter-vehicle distance Dt in the follow-up running. The auto-cruise setting switch 88 is provided in a steering wheel, for example, and is configured to supply the auto-cruise information Icrui containing the target running speed Vt and the target inter-vehicle distance Dt.

The electronic control apparatus 100 generates various output signals to the various devices provided in the vehicle 10, such as: an engine control command signal Se that is to be supplied to the engine control device 50 for controlling the engine 12, an MG control command signal Sm that is to be supplied to the inverter 52 for controlling the rotating machine MG; a CB hydraulic control command signal Scb that is to be supplied to the hydraulic control unit 56 for controlling the operation states of the engagement devices CB; a K0 hydraulic control command signal Sko that is to be supplied to the hydraulic control unit 56 for controlling the K0 clutch 20; an LU hydraulic control command signal Slu that is to be supplied to the hydraulic control unit 56 for controlling the operation state of the LU clutch 40; and an EOP control command signal Seop that is to be supplied to the pump motor 62 for operating the EOP 60. The hydraulic control unit 56 is provided with a plurality of solenoid valves for switching fluid passages and controlling hydraulic pressures in accordance with the CB hydraulic control command signal Scb, K0 hydraulic control command signal Sko and hydraulic control command signal Slu.

Further, in the present embodiment, the vehicle 10 includes an automatic brake system 90 that is to be involved in the auto-cruise driving. The automatic brake system 90 is configured to electrically control a brake force or brake hydraulic pressure of each of wheel brakes 92 that are respectively provided in the drive wheels 14 and driven wheels (non-drive wheels) (not shown), in accordance with an automatic-brake control command signal Sbr supplied from the electronic control apparatus 100. The brake hydraulic pressure is to be supplied to each of the wheel brakes 92 also through a brake master cylinder in response to a depressing operation applied to a brake pedal (not shown), such that each of the wheel brakes 92 mechanically generates the brake force based on the brake hydraulic pressure, i.e., a brake operation force applied to the brake pedal.

For performing various control operations in the vehicle 10, the electronic control apparatus 100 functionally includes a hybrid control portion 102, a shift control portion 104, an automatic-drive control portion 106 and a charging control portion 108.

The hybrid control portion 102 has a function of controlling cooperative operations of the engine 12 and the rotating machine MG, and includes an engine control portion 102a configured to control the engine 12 and an MG control portion 102b configured to control the rotating machine MG. The hybrid control portion 102 calculates the drive request amount requested to the vehicle 10 by the vehicle driver, by applying the accelerator opening degree θacc and the vehicle running speed V to a drive request amount map, for example, wherein the drive request amount is a requested drive torque Trdem that is to be applied to the drive wheels 14, for example. The hybrid control portion 102 obtains a requested TC input torque Ttcdem that is a required value of the input torque required to be inputted to the torque converter 22 for realizing the requested drive torque Trdem, for example, by taking account of various factors such as a transmission loss, an auxiliary load, the gear ratio γ of the automatic transmission 24 and a maximum chargeable amount Win and a maximum dischargeable amount Wout of the battery 54, and outputs the engine control command signal Se and the MG control command signal Smg for controlling the engine 12 and the rotating machine MG, respectively, such that the requested TC input torque Ttcdem can be obtained. The maximum chargeable amount Win and the maximum dischargeable amount Wout of the battery 54 are calculated, by the electronic control apparatus 100, based on the battery temperature THbat and the charged state value SOC [%] of the battery 54, for example. The charged state value SOC of the battery 54 is a value indicative of a charged state of the battery 54, i.e., an amount of the electric power stored or remaining in the battery 54, and is calculated by the electronic control apparatus 100, for example, based on the charging/discharging electric current Ibat and the voltage Vbat of the battery 54.

When the requested TC input torque Ttcdem can be covered by only the output of the rotating machine MG, the hybrid control portion 102 establishes a BEV (Battery Electric Vehicle) mode as a motor driving mode for causing the vehicle 10 to run by driving the rotating machine MG with only the electric power supplied from the battery 54. In the BEV mode, a BEV driving is performed to drive the vehicle 10 by using only the rotating machine MG as the drive power source while stopping the engine 12 with the K0 clutch 20 being placed in the released state. In the BEV mode, the MG torque Tmg is controlled such that the requested TC input torque Ttcdem is realized. When the requested TC input torque Ttcdem cannot be covered without using at least the output of the engine 12, the hybrid control portion 102 establishes an HEV (Hybrid Electric Vehicle) mode as an engine driving mode for causing the vehicle 10 to run by using at least the engine 12 as the drive power source while placing the K0 clutch 20 in the engaged state. In the HEV mode, the engine torque Te is controlled to realize all or a part of the requested TC input torque Ttcdem by the engine torque Te, and the MG torque Tmg is also controlled to compensate an insufficiency of the engine torque Te to the requested TC input torque Ttcdem, as needed. On the other hand, even when the requested TC input torque Ttcdem can be covered by only the output of the rotating machine MG, the hybrid control portion 102 establishes the HEV mode, for example, in a case in which the engine 12 or other parts of the power transmission apparatus 16 is required to be warmed up. Thus, the hybrid control portion 102 is configured, during the HEV driving, to automatically stop the engine 12 and to restart the engine 12 after having stopped the engine 12, and is configured, during the BEV driving, to start the engine 12 and to automatically stop and start the engine 12 when the vehicle 10 is being stopped. Thus, the hybrid control portion 102 switches between the BEV mode and the HEV mode, depending on the requested TC input torque Ttcdem or the like.

The shift control portion 104 is configured, when the D range is selected, to determine whether a shifting action is required or not in the automatic transmission 24, by using a shifting map or the like that is predetermined with variables (relating to an operation state of the vehicle 10) such as the vehicle running speed V and the accelerator opening degree θacc, and to execute an automatic shift control for outputting the CB hydraulic control command signal Scb, as needed, by which a currently established one of the forward-drive gear positions is to be automatically switched to another one of the forward-drive gear positions in the automatic transmission 24, such that the outputted the CB hydraulic control command signal Scb is supplied to the hydraulic control unit 56. Further, when the shift lever 64 or other manual-shift operating member disposed in vicinity of the driver seat of the vehicle 10 is operated by the vehicle driver and a shift command signal is supplied to the shift control portion 104, the shift control portion 104 is configured to execute a manual shift control by which a currently established one of the forward-drive gear positions is to be switched to another one of the forward-drive gear positions in the automatic transmission 24, in accordance with the shift command signal. Moreover, when one of the operation positions POSsh is switched to another one of the operation positions POSsh by operation of the shift lever 64, the shift control portion 104 is configured to execute a so-called "garage control" for switching the shift range of the automatic transmission, in accordance with the another one of the operation positions POSsh.

The automatic-drive control portion 106 is provided to execute the auto-cruise driving as the automatic driving, and is configured to calculate the requested drive torque Trdem required to enable the vehicle 10 to run at the target running speed Vt that is set in the auto-cruise setting switch 88, and to obtain the requested TC input torque Ttcdem required to realize the requested drive torque Trdem, by taking account of various factors such as the transmission loss, the auxiliary load and the gear ratio γ of the automatic transmission 24 and a torque ratio of the torque converter 22. Then, the automatic-drive control portion 106 outputs the engine control command signal Se for controlling the engine 12, and also the MG control command signal Smg for controlling the rotating machine MG. Further, the automatic-drive control portion 106 switches currently established one of the forward-drive gear positions to another one of the forward-drive gear positions, if needed. The requested drive torque Trdem is obtained based on a difference between the target running speed Vt and the actual running speed V of the vehicle 10, for example, through a feedback control or a feedforward control. Further, when the follow-up running is performed with the inter-vehicle distance Dis to a preceding vehicle being kept at the target inter-vehicle distance Dt, the automatic-drive control portion 106 calculates the requested drive torque Trdem required to keep the inter-vehicle distance Dis at the target inter-vehicle distance Dt, and to control the engine torque Te, the MG torque Tmg and establish one of the forward-drive gear positions, such that the requested drive torque Trdem is obtained. In a case in which the preceding vehicle is being stopped or running at an extremely low speed, the automatic-drive control portion 106 causes a creep torque to be generated based on an input/output rotational speed difference $\Delta Ntc$ (=Nmg−Nt) of the torque converter 22, by operating the engine 12 with an idle torque Tidle, for example, with the LU clutch 40 being placed in the released state, so as to cause the vehicle 10 to perform a creep running, in cooperation with control of the brake forces of the wheel brakes 92 by the automatic brake system 90. In a case in which the requested drive torque Trdem is a negative (minus) torque, for example, upon deceleration of the preceding vehicle, the automatic-drive control portion 106 causes the engine brake and/or the regenerative brake to be generated by the engine 12 and the rotating machine MG, optionally together with the brake forces of the wheel brakes 92 controlled by the automatic brake system 90, if needed, so as to obtain the requested drive torque Trdem that is a negative torque.

The charging control portion 108 is configured, when the vehicle 10 is to be decelerated or braked, for example, to execute a charging control for charging the battery 54 by subjecting the rotating machine MG to a regenerative control, such that the charged state value SOC is held within a range defined between an allowable lower limit SOCmin and an allowable upper limit SOCmax that are determined based on a charge/discharge efficiency, for example. When the charged state value SOC becomes lower than the allowable lower limit SOCmin, the BEV mode that is inhibited and the vehicle 10 is to be driven with only the HEV mode. In this case, the charging control portion 108 is configured, during running of the vehicle 10 using only the engine 12 as the drive power source with the HEV mode, to execute the charging control for forcibly charging the battery 54 by subjecting the rotating machine MG (that is driven and rotated by the engine 12) to the regenerative control. Specifically, the charging control portion 108 causes the MG control command signal Smg to be supplied to the inverter 52 while causing the rotating machine MG to be driven and rotated by the engine 12, so as to charge the battery 54 by the regenerative control of the rotating machine MG, and controls the charging amount Pch to the battery 54 by controlling the electric power (regenerative torque) generated by the rotating machine MG. Further, the charging control portion 108 causes the engine torque Te to be increased by a charge compensating torque Tcom corresponding to the charging amount Pch, i.e., the regenerative torque of the rotating machine MG, so as to suppress the drive power fluctuation caused by the execution of the charging control. This charging control for forcibly charging the battery 54 is executed, for example, until the charged state value SOC becomes a target charged state value SOCt that is sufficiently higher than the allowable lower limit SOCmin.

Since the engine torque Te is increased with a delay with respect to the engine control command signal Se, it is difficult to reliably prevent the drive power fluctuation caused by the execution of the charging control, by controlling the engine torque Te to increase the engine torque Te. Particularly, during the auto-cruise driving, since the acceleration/deceleration operation is not manually made by the vehicle driver, the vehicle driver is likely to feel the sense of discomfort even when the drive power fluctuation is small. Further, when the vehicle 10 is running at a low speed with the requested drive torque Trdem being small, the engine torque Te is increased by a relatively large amount (charge compensating torque Tcom) because of execution of the charging control so that the drive power fluctuation is likely to be caused with a high possibility, and road noise is small during running of the vehicle 10 at a low speed so that the drive power fluctuation is unlikely to be absorbed by the road noise and drivability is problematically reduced due to the drive power fluctuation.

Further, in the present embodiment, even in the HEV mode during the auto-cruise driving, when the vehicle 10 performs the follow-up running or starts to run, there is a case in which the creep torque is generated based on the input/output rotational speed difference $\Delta Ntc$ of the torque converter 22, by operating the engine 12 with the idle torque Tidle, for example, with the LU clutch 40 being placed in the released state, so as to cause the vehicle 10 to perform the creep running, in cooperation with control of the brake forces of the wheel brakes 92 by the automatic brake system 90. If the charging control is started during the creep running of the vehicle 10, the engine rotational speed Ne could be increased together with increase of the engine torque Te, irrespective of generation of the electric power (regenerative torque) by the rotating machine MG. The increase of the engine rotational speed Ne causes the input/output rotational speed difference $\Delta Ntc$ of the torque converter 22 to be increased whereby the creep torque is increased, so that the drivability could be reduced by the drive power fluctuation due to the increase of the creep torque, and booming noise could be generated when the engine rotational speed Ne passes through a resonance region in process of the increase of the engine rotational speed Ne.

Figure 2:
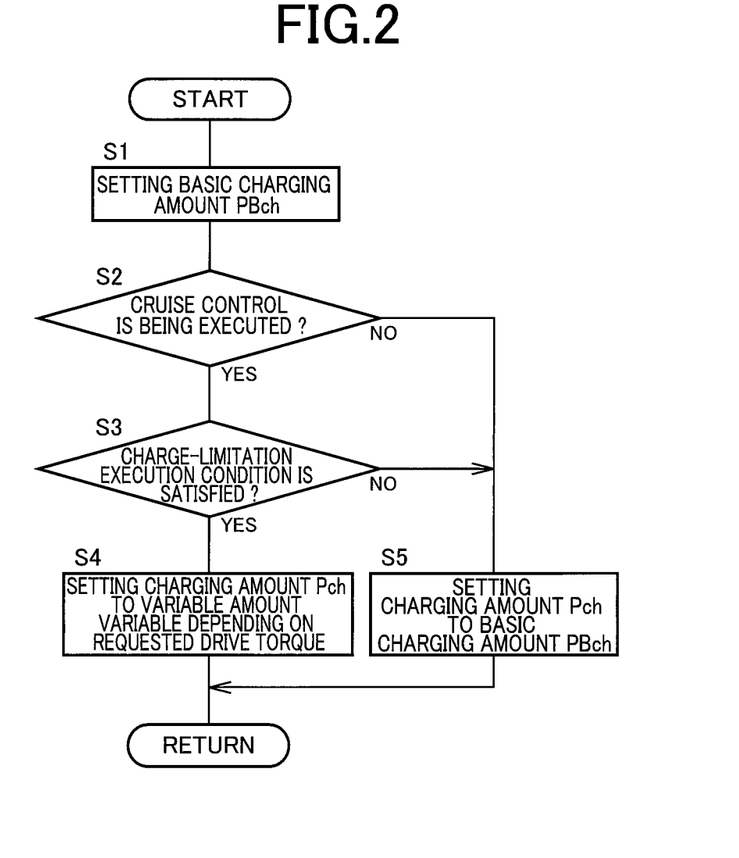
FIG. 2 is a flow chart showing a control routine to be executed by a charging control portion that is functionally included in an electronic control apparatus of the hybrid electric vehicle shown in FIG. 1, so as to change a charging amount depending on whether an auto cruise control as an automatic drive control is being executed or not.

On the other hand, in the present embodiment, as shown in a flow chart of FIG. 2, it is determined whether a cruise control is being executed or not, namely, whether the auto-cruise driving is being executed by the automatic-drive control portion 106 or not, and the charging is limited by reducing the charging amount Pch depending on the requested drive torque Trdem during execution of the auto-cruise driving. A control routine shown by the flow chart of FIG. 2 starts to be executed upon satisfaction of a charging condition for charging the battery 54 such as when the charged state value SOC of the battery 54 becomes lower than the allowable lower limit SOCmin and when a temperature becomes so low that the discharging amount becomes large. The control routine is repeatedly executed until satisfaction of a terminating condition for terminating the charging control such as when the charged state value SOC has reached the target charged state value SOCt.

As shown in FIG. 2, the control routine is initiated with step S1 that is implemented to set a basic charging amount PBch. The basic charging amount PBch may be a constant value. However, in the present embodiment, the basic charging amount PBch is set to a variable value in accordance with a predetermined map or arithmetic expressions such that the basic charging amount PBch is made larger when a difference ΔSOC(=SOCt−SOC) between the target charged state value SOCt and the current charged state value SOC is large, than when the difference ΔSOC is small. Further, the basic charging amount PBch may be set by taking account of other vehicle state that affects charging/discharging of the battery 54 or a degree of charging request. Step S1 is followed by step S2 that is implemented to determine whether the cruise control is being executed or not, namely, whether the auto-cruise driving is being executed by the automatic-drive control portion 106 or not. When a negative determination is made at step S2, namely, when the vehicle 10 is being manually driven without the cruise control being executed, the control flow goes to step S5 in which the charging amount Pch is set to the basic charging amount PBch so that the charging control is executed with the basic charging amount PBch as the charging amount Pch. Thus, since the charging control is executed with use of the basic charging amount PBch as the charging amount Pch when the vehicle 10 is manually driven to run, the basic charging amount PBch is determined by taking account of influence of the charging control affecting on the drivability given to the vehicle driver when the vehicle 10 is manually driven to run.

When an affirmative (YES) determination is made at step S2, namely, when the auto-cruise driving is being executed with execution of the cruise control, step S3 is implemented to determine whether the vehicle running speed V satisfies a predetermined charge-limitation execution condition or not. Specifically, when the running speed V is not higher than a predetermined charge-limitation-determination speed value Vs, it is determined that the running speed V satisfies the charge-limitation execution condition, and step S4 is implemented to limit the charging amount Pch. When the running speed V is higher than the charge-limitation-determination speed value Vs (V>Vs), the control flow goes to step S5 in which the charging amount Pch is set to the basic charging amount PBch. The charge-limitation-determination speed value Vs is a low running speed at which the road noise is so small that the drive power fluctuation generated due to the charging control becomes problematic even if the drive power fluctuation is small. For example, the charge-limitation-determination speed value Vs is determined by experimentation or the like so as to be within range that is not higher than about 40 km/hour, for example. The charge-limitation execution condition is for suppressing limitation of the charging amount to a minimally required degree, and may include, in addition to or in place of the condition relating to the running speed V, another condition other than the condition relating to the running speed V. It is noted that the above-described step S3 may be implemented before implementation of the above-described step S2. It is also noted that the predetermined charge-limitation-determination speed value Vs corresponds to "predetermined speed value" recited in the appended claims.

Figure 3:
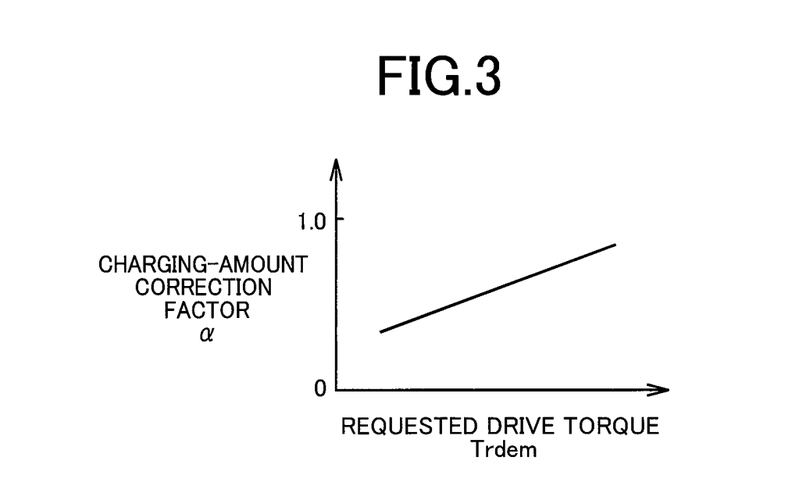
FIG. 3 is an example of data map defining a charging-amount correction factor $\alpha$ that is to be used when a charging amount Pch is to be obtained depending on a requested drive torque Trdem at step S4 in the control routine shown in FIG. 2.

At step S4, the charging amount Pch during execution of the auto-cruise driving is set to a variable amount which is variable depending on the requested drive torque Trdem and which is within a range not larger than the basic charging amount PBch. Specifically described, for example, as shown in a map of FIG. 3, a charging-amount correction factor α is predetermined such that the charging-amount correction factor α is continuously reduced, within a range not larger than 1.0, as the requested drive torque Trdem is reduced. The charging-amount correction factor α is obtained depending on the actual requested drive torque Trdem in accordance with the map of FIG. 3 and arithmetic expressions, and the charging amount Pch is calculated by multiplying the basic charging amount PBch with the obtained charging-amount correction factor α. Thus, the charging amount Pch is made smaller when the requested drive torque Trdem is small than when the requested drive torque Trdem is large, and the charging control is executed for the battery 54 by using the thus calculated charging amount Pch. In the map of the FIG. 3, the charging-amount correction factor α is changed linearly. However, the charging-amount correction factor α may be changed in any of various manners such as a non-linear manner (e.g., curved manner), a polygonal-linear manner and a stepped manner.

Figure 4:
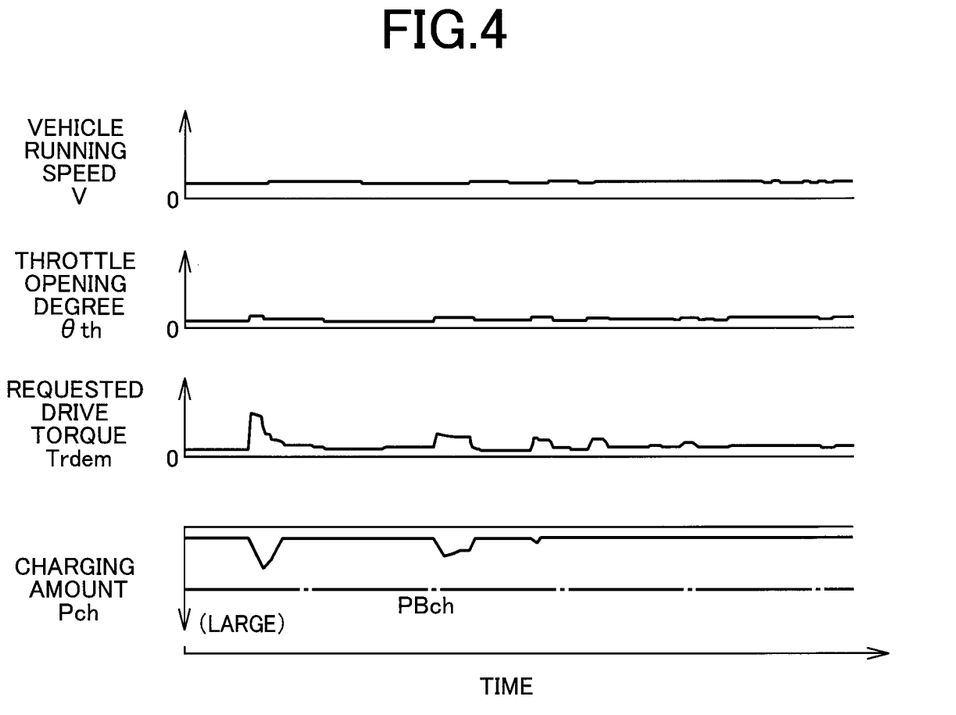
FIG. 4 is an example of time chart showing changes of operation states of respective parts in a case in which a charging control is executed during an auto-cruise driving as an automatic driving of the vehicle.

FIG. 4 is an example of time chart showing changes of operation states of respective parts in a case in which the charging control is executed during the auto-cruise driving as the automatic driving of the vehicle 10, with the charging amount Pch being set through the control routine shown in the flow chart of FIG. 2. In the case shown in FIG. 4, the target running speed Vt is a constant speed value of about 20-30 km/hour, and the charging amount Pch is set to the variable amount which is variable depending on the requested drive torque Trdem and which is not larger than the basic charging amount PBch. When the requested drive torque Trdem is changed to be increased or reduced by change of the vehicle running speed V caused due to change of a road gradient Φ, the charging amount Pch is changed to be increased or reduced with the change of the requested drive torque Trdem, and the throttle opening degree θth is controlled in accordance with the engine torque Te that is obtained depending on the changed requested drive torque Trdem and charging amount Pch.

As described above, in the electronic control apparatus 100 in the present embodiment, in the charging control during the auto-cruise driving as the automatic driving of the vehicle 10, the charging amount Pch is made smaller when the requested drive torque Trdem is small than when the requested drive torque Trdem is large. Therefore, when the requested drive torque Trdem is small, namely, when the influence of the drive power fluctuation caused by execution of the charging control is large, the increase (corresponding to the charge compensating torque Tcom) of the engine toque Te due to the charging control is reduced whereby the drive power fluctuation is reduced, so that it is possible to suppress the reduction of the drivability due to the drive power fluctuation, even when the road noise is small during running of the vehicle 10 at a low speed. On the other hand, even during the auto-cruise driving of the vehicle 10, when the requested drive torque Trdem is large, namely, when the influence of the drive power fluctuation caused by execution of the charging control is relatively small, the charging amount Pch is increased whereby the battery 54 can be charged rapidly, so that it is possible to ensure a desired charging performance, while suppressing the reduction of the drivability when the requested drive torque Trdem is small.

Further, the charging control is executed with the predetermined basic charging amount PBch during the manual driving of the vehicle 10, and the charging control is executed with the variable amount as the charging amount Pch which is variable depending on the requested drive torque Trdem and which is not larger than the basic charging amount PBch during the auto-cruise driving of the vehicle 10. Therefore, it is possible to appropriately maintain the charging performance during the manual driving in which the drive power fluctuation is unlikely to be problematic, and to appropriately suppress the reduction of the drivability due to the charging control during the auto-cruise driving.

Further, during the auto-cruise driving of the vehicle 10, the charging amount Pch is set to the variable amount that is variable depending on the requested drive torque Trdem, on the condition that the vehicle running speed V is not higher than the charge-limitation-determination speed value Vs as the predetermined speed value, so that it is possible to appropriately suppress the reduction of the drivability due to the drive power fluctuation when the road noise is small during the running of the vehicle 10 at a low speed. On the other hand, even during the auto-cruise driving of the vehicle 10, the charging amount Pch is set to the basic charging amount PBch as during the manual driving of the vehicle, when the vehicle running speed V is relatively high (V>Vs), namely, when the road noise is so large that the drive power fluctuation is unlikely to be recognized, so that it is possible to suppress limitation of the charging amount Pch to a minimally required degree.

Further, when the creep running is performed by the creep torque generated by operation of the engine 12 with the idle torque Tidle, etc., with the LU clutch 40 being released, the charging amount Pch is reduced by setting the charging amount Pch to the variable amount that is variable depending on the requested drive torque Trdem, because the creep running is performed, in general, in a situation in which the requested drive torque Trdem is low. Thus, the increase (corresponding to the charge compensating torque Tcom) of the engine toque Te due to the charging control is reduced whereby the increase of the engine rotational speed Ne due to increase of the engine torque Te is reduced. Therefore, it is possible to reduce the increase of the creep torque caused by the increase of the input/output rotational speed difference ΔNtc of the torque converter 22 due to the increase of the engine rotational speed Ne, and accordingly to suppress the reduction of the drivability due to the drive power fluctuation caused by the increase of the creep torque and avoid or suppress generation of the booming noise in the process of the increase of the engine rotational speed Ne.

In the above-described embodiment, the charge-limitation execution condition, which is determined to be satisfied or not at step S3 in the above-described control routine shown in FIG. 2, relates to the vehicle running speed V. However, the charge-limitation execution condition may include, in addition to or in place of the condition relating to the running speed V, another condition relating to the charged state value SOC. Specifically described, it is determined whether the charged state value SOC is a predetermined charge-limitation-determination state value SOCs or higher. When the charged state value SOC is not lower than the predetermined charge-limitation-determination state value SOCs, it is determined that the charge-limitation execution condition is satisfied whereby step S4 is implemented to limit the charging amount Pch depending on the requested drive torque Trdem. When the charged state value SOC is lower than the predetermined charge-limitation-determination state value SOCs (SOC<SOCs), it is determined that need for the charging the battery 54 is high whereby step S5 is implemented to set the charging amount Pch to the basic charging amount PBch. The charge-limitation-determination state value SOCs is for excluding a case in which the charged state value SOC is so low that the charged state value SOC needs to be quickly recovered. The charge-limitation-determination state value SOCs is set to a value which is higher than the allowable lower limit SOCmin and lower than the target charged state value SOCt, through an experimentation or the like, and which corresponds to at least about 40% in the charged state value SOC, for example. It is also noted that the predetermined charge-limitation-determination state value SOCs corresponds to "predetermined state value" recited in the appended claims.

In this case, during the auto-cruise driving of the vehicle 10, the charging amount Pch is set to the variable amount that is variable depending on the requested drive torque Trdem, on the condition that the charged state value SOC of the battery 54 is not lower than the charge-limitation-determination state value SOCs as the predetermined state value, so that it is possible to suppress the reduction of the drivability due to the drive power fluctuation caused with the requested drive torque Trdem being small, when the forcible charging control is started upon satisfaction of the charging condition such as when the temperature becomes so low rather than when the charged state value SOC becomes lower than the allowable lower limit SOCmin. Even during the auto-cruise driving, the charging amount Pch is set to the basic charging amount PBch as during the manual driving of the vehicle 10, when the charged state value SOC of the battery 54 is lower than the charge-limitation-determination state value SOCs. Therefore, it is possible to appropriately prevent an electric power amount stored in the battery 54, from being insufficient, by quickly charging the battery 54, so as to avoid insufficiency of the electric power amount stored in the battery 54, while appropriately suppressing the reduction of the drivability due to the charging control executed with the requested drive torque Trdem being small in a case in which the charging control is started with the charged state value SOC of the battery 54 being not lower than the charge-limitation-determination state value SOCs.

It is to be understood that the embodiment described above is given for illustrative purpose only, and that the present invention may be embodied with various modifications and improvements which may occur to those skilled in the art.

NOMENCLATURE OF ELEMENTS

10: hybrid electric vehicle (vehicle)
12: engine (drive power source)
14: drive wheels
16: power transmission apparatus (power transmission path)
22: torque converter
54: battery (electric storage device)
100: electronic control apparatus (control apparatus)
106: automatic-drive control portion
108: charging control portion
MG: rotating machine (drive power source)
Trdem: requested drive torque
Pch: charging amount
PBch: basic charging amount

What is claimed is:
1. A control apparatus for a vehicle that includes an engine used as a drive power source, a rotating machine serving as at least an electric power generator, and an electric storage device,
the control apparatus comprising:
an automatic-drive control portion configured to execute an automatic drive control for automatically controlling a torque of the drive power source in accordance with a requested drive torque that is obtained for causing the vehicle to run with a predetermined target running state without requiring an acceleration/deceleration operation by a driver of the vehicle; and a charging control portion configured, during running of the vehicle using the engine as the drive power source, to cause the rotating machine to generate an electric power by driving and rotating the rotating machine by the engine, and to control a charging amount by which the electric storage device is to be charged, by controlling the electric power generated by the rotating machine, while increasing a torque of the engine, depending on the controlled charging amount, wherein the charging control portion is configured, when the vehicle is being driven with execution of the automatic drive control, to set the charging amount, depending on the requested drive torque, such that the charging amount is smaller when the requested drive torque is small than when the requested drive torque is large, wherein, when the vehicle is being manually driven with the torque of the drive power source being controlled in accordance with an acceleration/deceleration operation by the driver of the vehicle without the automatic drive control being executed by the automatic-drive control portion, the charging control portion is configured to set the charging amount to a basic charging amount so as to charge the electric storage device by the basic charging amount, and wherein, when the vehicle is being driven with execution of the automatic drive control, the charging control portion is configured to set the charging amount to a variable amount which is variable depending on the requested drive torque and which is not larger than the basic charging amount.

2. The control apparatus according to claim 1, wherein the charging control portion is configured to set the charging amount to the variable amount which is variable depending on the requested drive torque and which is not larger than the basic charging amount, on the condition that a running speed of the vehicle is not higher than a predetermined speed value, when the vehicle is being driven with execution of the automatic drive control, and wherein the charging control portion is configured to set the charging amount to the basic charging amount so as to charge the electric storage device by the basic charging amount, on the condition that the running speed of the vehicle is higher than the predetermined speed value, even when the vehicle is being driven with execution of the automatic drive control.

3. The control apparatus according to claim 1, wherein the charging control portion is configured to set the charging amount to the variable amount which is variable depending on the requested drive torque and which is not larger than the basic charging amount, on the condition that a charged state value of the electric storage device is not lower than a predetermined state value, when the vehicle is being driven with execution of the automatic drive control, and wherein the charging control portion is configured to set the charging amount to the basic charging amount so as to charge the electric storage device by the basic charging amount, on the condition that the charged state value of the electric storage device is lower than the predetermined state value, even when the vehicle is being driven with execution of the automatic drive control.

4. A control apparatus for a vehicle that includes an engine used as a drive power source, a rotating machine serving as at least an electric power generator, and an electric storage device, the control apparatus comprising:

an automatic-drive control portion configured to execute an automatic drive control for automatically controlling a torque of the drive power source in accordance with a requested drive torque that is obtained for causing the vehicle to run with a predetermined target running state without requiring an acceleration/deceleration operation by a driver of the vehicle; and a charging control portion configured, during running of the vehicle using the engine as the drive power source, to cause the rotating machine to generate an electric power by driving and rotating the rotating machine by the engine, and to control a charging amount by which the electric storage device is to be charged, by controlling the electric power generated by the rotating machine, while increasing a torque of the engine, depending on the controlled charging amount, wherein the charging control portion is configured, when the vehicle is being driven with execution of the automatic drive control, to set the charging amount, depending on the requested drive torque, such that the charging amount is smaller when the requested drive torque is small than when the requested drive torque is large, and wherein the automatic-drive control portion is configured to execute the automatic drive control, by causing a creep torque to be generated based on a rotational speed difference between input and output members of a torque converter that is provided in a power transmission path between the drive power source and the drive wheels.

* * * * *